(12) United States Patent
Chan et al.

(10) Patent No.: US 11,444,935 B2
(45) Date of Patent: Sep. 13, 2022

(54) CERTIFICATE-BASED CLIENT AUTHENTICATION AND AUTHORIZATION FOR AUTOMATED INTERFACE

(71) Applicant: ARRIS Enterprises LLC, Suwanee, GA (US)

(72) Inventors: Tat Keung Chan, San Diego, CA (US); Jinsong Zheng, San Diego, CA (US); Alexander Medvinsky, San Diego, CA (US); Ting Yao, San Diego, CA (US); Jason A. Pasion, San Diego, CA (US); Eric Brunnett-Lazarte, La Mesa, CA (US); Cheng Li, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/119,646

(22) Filed: Dec. 11, 2020

(65) Prior Publication Data

US 2021/0194704 A1 Jun. 24, 2021

Related U.S. Application Data

(60) Provisional application No. 63/073,579, filed on Sep. 2, 2020, provisional application No. 62/946,928, filed on Dec. 11, 2019.

(51) Int. Cl.
*H04L 29/06* (2006.01)
*H04L 9/40* (2022.01)
(Continued)

(52) U.S. Cl.
CPC ........ *H04L 63/0823* (2013.01); *G06F 21/105* (2013.01); *H04L 9/3268* (2013.01);
(Continued)

(58) Field of Classification Search
CPC .................................................. H04L 63/0823
See application file for complete search history.

(56) References Cited

U.S. PATENT DOCUMENTS

| 7,194,761 B1 * | 3/2007 | Champagne | ............ H04L 63/08 713/168 |
| 8,954,732 B1 | 2/2015 | Watsen et al. | |

(Continued)

FOREIGN PATENT DOCUMENTS

| EP | 1770589 | 4/2007 |
| WO | 2005/112340 | 11/2005 |

OTHER PUBLICATIONS

EPO Extended European Search Report, RE: Application No. 17159595.2, dated Jul. 5, 2017.

*Primary Examiner* — Bradley W Holder
(74) *Attorney, Agent, or Firm* — Chernoff, Vilhauer, McClung & Stenzel, LLP

(57) ABSTRACT

A method and system provide the ability to authenticate client services. A private key and a client certificate are created and delivered to a client. Based on the private key and the certificate, a client account is created for the client on a server. One or more signing or feature licensing configurations are created and authorized on the server for the client account. The client certificate and a request to perform a requested client service are received on the server from a client. The request includes configuration information for the requested client service. The server verifies the client certificate and determines whether the client is authorized to perform the requested client service. The determination is based on the configuration information and the one or more authorized client operations. Upon determining that the client is authorized to perform the requested client service, the request is processed the authorization is sent to the client. Upon a determination that the client is not (Continued)

authorized to perform the requested client service, the requested client service is denied.

18 Claims, 4 Drawing Sheets

(51) Int. Cl.
*H04L 9/32* (2006.01)
*G06F 21/10* (2013.01)

(52) U.S. Cl.
CPC ...... *H04L 63/0428* (2013.01); *H04L 63/0869* (2013.01); *H04L 63/166* (2013.01)

(56) References Cited

U.S. PATENT DOCUMENTS

| | | | | |
|---|---|---|---|---|
| 2004/0078597 | A1* | 4/2004 | Sun | H04L 63/205 726/4 |
| 2008/0288405 | A1* | 11/2008 | John | G06Q 20/386 705/44 |
| 2011/0047374 | A1 | 2/2011 | Liu et al. | |
| 2018/0332016 | A1* | 11/2018 | Pandey | H04L 63/0428 |

\* cited by examiner

CERTIFICATE-BASED CLIENT AUTHENTICATION AND AUTHORIZATION FOR AUTOMATED INTERFACE

CROSS-REFERENCE TO RELATED APPLICATIONS

This application claims benefit of U.S. Provisional Patent Application No. 62/946,928, filed on Dec. 11, 2019, by Tat Keung Chan, Jinsong Zheng, Alexander Medvinsky, Ting Yao, Jason A. Pasion, Eric Brunnett-Lazarte, and Cheng Li, and U.S. Provisional Patent Application No. 63/073,579, filed Sep. 2, 2020 by Tat Keung Chan, Jinsong Zheng, Alexander Medvinsky, Ting Yao, Jason A. Pasion, Eric Brunnett-Lazarte, and Cheng Li, both of which applications are hereby incorporated by reference herein.

This application is also related to the following co-pending and commonly-assigned patent application, which application is incorporated by reference herein:

U.S. patent application Ser. No. 15/450,424, filed on Mar. 6, 2017, by Ting Yao, Xin Qiu, Jinsong Zheng, Patrick Dizon, Aye Myint, Annie C. Curamoto, Reshma T. Shahabuddin, and Thomas J. Barbour, entitled "METHOD AND APPARATUS FOR USER AND ENTITY ACCESS MANAGEMENT FOR CODE SIGNING ONE OR MORE OF A PLURALITY OF DEVICES," which application claims benefit of U.S. Provisional Patent Application No. 62/304,641, entitled "GENERIC ENTITY AND USER ACCESS MANAGEMENT FRAMEWORK FOR CODE SIGNING SERVICES," by Ting Yao, Xin Qiu, Jinsong Zheng, Patrick Dizon, Aye Myint, Annie C. Kuramoto, Reshma T. Shahabuddin, and Thomas J. Barbour, filed Mar. 7, 2016, which application is hereby incorporated by reference herein.

BACKGROUND

1. Field

The present disclosure relates to systems and methods for signing, encrypting and/or decrypting data for use on devices, and in particular to a system and method for authenticating and authorizing client services.

2. Description of the Related Art

Client devices often provide a variety of services ranging from distributing, installing, and updating code (e.g., onto field client devices) to licensing software. To ensure adequate security and that the services are not received from or being executed by unauthorized sources, authentication and security is required. However prior art authentication and security systems may be inadequate and/or fail to provide the level of customization/configuration that is desired. To better understand such problems of the prior art, a description or prior art client authentication and authorization services may be useful.

It is beneficial in some circumstances to provide data to devices which have already been distributed to end users (e.g. fielded devices). Such data may be needed to update the device(s) to newer configurations or to perform additional functions, to ameliorate software "bugs" or other issues, or to simply replace data already resident in the device that may have been compromised. Such data may include software instructions (e.g. code) to update fielded devices by providing data such as software code to those devices remotely.

One of the problems with the remote downloading of such data to fielded devices is that the data may be from an unauthorized source. An entity providing the data to the fielded devices may pose as a legitimate source of the data, yet provide data that is designed to compromise the security or functionality of the device. For example, the user of the device may be misled into believing that their device needs a software update in order to function properly, and may be provided a bogus uniform resource location (URL) from which to download the software update. If the user downloads and installs the software update from the bogus URL, the code that is actually downloaded may include a virus or other malware that negatively affects the operation of the device, perhaps compromising all of the data (including the user's private information) that was stored by the device before the infected.

To prevent the foregoing problems, code signing techniques can be used to digitally sign data such as executables and scripts. Such signatures confirm the identity of the author of the data and guarantee that the data has not been altered or otherwise corrupted since it was signed. Most code signing paradigms provide a digital signature mechanism to verify the identity of the author of the data or build system, and a checksum to verify that the data object has not been modified. Such code signing paradigms typically use authentication mechanisms such as public key infrastructure (PKI) technologies, which rely on data publishers securing their private keys against unauthorized access. The public key used to authenticate the data signature should be traceable back to a trusted root certificate authority (CA). If the data signature is traced to a CA that the device user trusts, the user is presumed to be able to trust the legitimacy and authorship of the data that is signed with a key generated by that CA. Such a system is referred to as a chain of trust and refers to the concept such that if the issuing CA is trusted and the chain can be traced to a trusted root certificate from that issuing CA, the entire chain is trusted and no further information/authentication is performed. However, it is undesirable to simply rely on a base trusted root certificate.

Systems for code signing are known in the art. However, such prior art code signing systems do not provide a framework that allows different organizations or companies to structure their data signing permission needs as they see fit or to safely permit data signing by other independent organizations. In other words, there may be a need/desire to customize the configuration and authentication of a software system. For example, assume Company A produces a set top box that can use a chip that can execute software from Company 1 or Company 2. Company A may desire to establish a data signing framework that allows Company 1 to sign data that it installs into their set top boxes, without providing Company 2 with access to that data signing framework. Similarly, Company A may desire to establish a data signing framework that allows Company 2 to establish a data signing framework that excludes (or includes) Company 1. In another example, a particular client/software provider may need to update a particular feature of a software application based on the type of end user within an organization (e.g., an administrator may be have feature while another user may have a different or fewer features). Accordingly, it is desirable to utilize a more flexible/configurable system than that of a chain based authentication system or other system of the prior art.

Alternative prior art code signing systems include the issuance of USB crypto tokens (i.e., hardware dongles) for authentication. However, the use of hardware tokens is undesirable in some scenarios.

In addition to code signing, feature licensing systems require authentication and configurable licenses for certain clients and subcategories within a client (e.g., types of users). However, prior art feature licensing systems lack configurability while ensuring security without the use of a hardware token/dongle.

In view of the above, what is needed is a system and method that provides a configurable system for the management, authentication and authorization of client services for code or configuration signing and encryption.

SUMMARY OF THE INVENTION

Embodiments of the invention overcome the problems of the prior art by providing an automated client service application that authenticates a client and authorizes a requested client service without using hardware encryption token/dongles. Embodiments utilize a client certificate that includes configuration information to provide a flexible system. In particular, a code signing server is configured with a service/operation configuration on a per/client account basis. Upon receipt of a service application request received from a client, the code signing server verifies a client certificate, checks the authorization of the client (via the service/operation configuration), and generates an appropriate authorization or authorization denial that is transmitted to the client service application via a secure communication protocol.

More specifically, embodiments of the invention provide the ability to authenticate client services. A private key and a client certificate are created for a client service application. The private key and the client certificate are delivered to and installed in an environment of the client service application. Based on the private key and the certificate, a client account is created for the client service application on a server. One or more authorized client operations are defined on the server for the client account. The client certificate and a request to perform a requested client service are received, from the client service application on the server. The request includes a server configuration identifier for the requested client service. The server verifies the client certificate at an application layer and extracts a client account ID from the client certificate. A determination is made regarding whether the client account corresponding to the client service application is authorized to perform the requested client service. Such a determination is based on the client account ID and configuration information associated with the server configuration identifier. Upon determining that the client account is authorized to perform the requested client service, the request is processed and an authorization is sent to the client service application. Upon determining that the client account is not authorized to perform the requested client service, requested client service is denied.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

Embodiments of the invention provide the ability to authenticate a client in a client-server model that does not utilize client-side hardware encryption (e.g., a token/dongle) in a configurable manner. Embodiments of the invention may be utilized in any system where client services are being provided including a code signing service or feature licensing system (e.g., providing licensing generation) that may be implemented in the cloud network. Note that "code signing service" in this description refers to various cryptographic operations in general, including code signing, code encryption, code obfuscation, hashing, and any combinations of these operations.

Architectural System/Logical Flow

Figure 1:
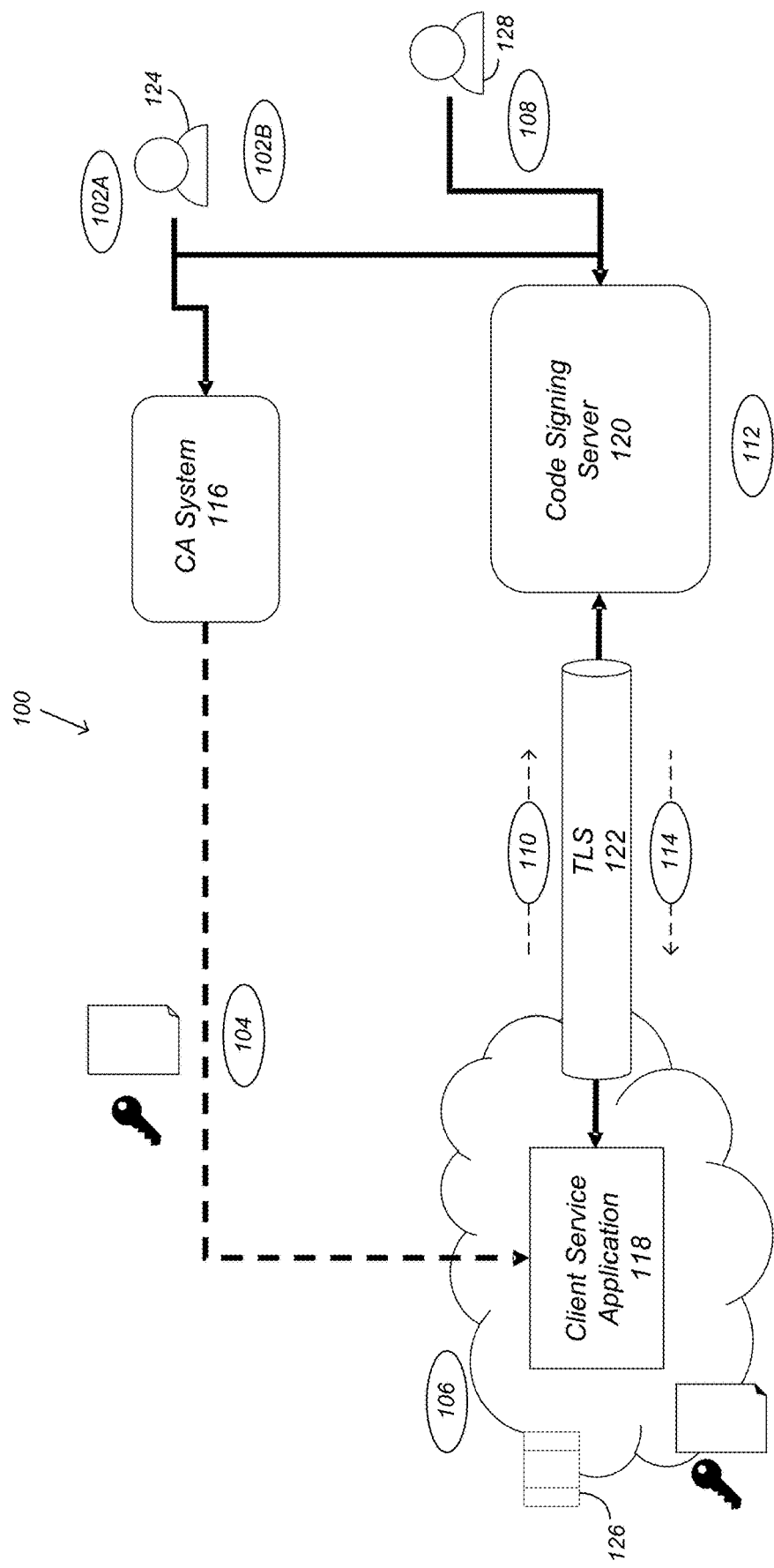
FIG. 1 illustrates the architecture and logical flow for authenticating client services/a client in accordance with one or more embodiments of the invention.

FIG. 1 illustrates the architecture and logical flow for authenticating client services/a client in accordance with one or more embodiments of the invention. The flow in system 100 is represented by steps 102-114 performed by system components 116-122.

At step 102A, an administrator 124 uses a CA system 116 (i.e., a system that issues certificates from the assignee of the present application) to create a certificate and private key for a client service application 118. Such a client may be bound to a single physical computer or it may be instantiated one or more times in a cloud based system.

At step 104, the certificate and key are delivered to the client service application 118 in an encrypted format. Embodiments of the invention are not limited to a particular protection format/methodology. In this regard, any type of encrypted format may be used including password protection, public-private key encryption, hardware token/dongle, etc.

At step 106, the private key and certificate are installed into the environment of a client service application 118. The client service application 118 may include an implementation of an application programming interface (API) specified by a server entity.

At step 102B (which may be executed in parallel or shortly after step 102A), a client account is created on a code signing server 120 based on the created certificate and key. Such a step may be a manual operation where the administrator 124 creating the certificate on the CA system 116 comes into the code signing server 120 and sets up the account. Such an account creates a client account 126 with the newly created certificate such that the code signing server 120 recognizes there is a new client account 126. The code signing server 120 treats client account 126 similar to human user accounts and assigns it code signing privileges in a similar manner.

At step 108, a project administrator 128 authorizes the client account 126 to perform particular operations (e.g., using the client service application 118) on the code signing server 120. In this regard, in step 108, the code signing server 120 simply establishes the permissions for the operations that the client account 126 is authorized to perform. In this regard, while step 102B registers the client account 126, the client account may not be authorized, by default, to perform all operations. Instead, the permissions/authorizations are also delineated/defined at step 108. Further, the client service application 118 associated with the client account 126 may not perform/provide any services prior to defining the permissions/authorization.

Steps 110-112 are the steps performed each time the client service application 118 performs an operation requiring authentication. The communication between the client service application 118 and the code signing server 120 may be performed via a two-way (2-way) transport layer security (TLS) connection 122. To define the 2-way TLS connection 122, both the client service application 118 and server mutually authenticate each other (referred to as a handshake). For example, the server may authenticate the client service application 118 using the client certificate that is issued in step 102A and installed at step 106, and the client service application 118 may authenticate the server using the server certificate presented by the server during the TLS handshake to ensure that the client is not communicating with a compromised server. Note that the client is preconfigured with the root certificate that the server certificate is issued from.

At step 110, the client service application 118 transmits a request to perform an operation to the code signing server 120. The request 110 may include the specific configuration for the operation to be performed (e.g., an indicator as to the operation to be performed so that the server 120 knows what is being requested). In an exemplary embodiment of a code signing operation, the request 110 may consist of a signing request (e.g., that includes the code to be signed or a code hash). The signing request itself may consist of a signing configuration identifier (also referred to as request configuration, where the corresponding configuration with this identifier stored on the server includes the operation for which authorization is requested and further configuration details). As part of the configuration (or separate from), the client account 126 ID may be provided. However, the identity of the client account 126 may already be provided during the two-way TLS handshake such that the identity (within the client certificate) may be provided to the server 120 during the handshake (so that the client service application 118 may not need to provide a client account ID again with the request 110). On the other hand, client service application 118 may provide additional client identity information such as client type, physical user name responsible for administering the client service application 118, client site information, etc. for server's logging purpose. This additional informational client information provided will not be used to determine if a client is authorized, but may be useful in troubleshooting and debugging use.

At step 112, in response to the request 110 (which includes the request configuration) the server 120 verifies the client certificate, checks the authorization of the client service application 118 based on the request configuration, and generates a response (e.g., an authorization or a rejection). In other words, at step 112, the server 120 checks to see if the client account 126 associated with the client service application 118 is indeed authorized for the particular requested operation (based on the authorization defined in step 108). In one or more embodiments, the server 120 performs an additional authentication of the client service application 118 by extracting the certificate from the lower transport layer (i.e., from the TLS connection 122) and verifying the client certificate once again. In this regard, the different layers referred to herein refer to the open systems interconnection model (OSI model) that partitions a communication system into abstraction layers (i.e., application layer, presentation layer, session layer, transport layer, network layer, data link layer, and physical layer).

Once the client service application 118 is authenticated and the authorization is confirmed, the request 110 is processed by generating a response that is transmitted back to the client service application 118. Accordingly, at step 114, the response is transmitted back to the client service application 118. In an exemplary embodiment of a code signing request, the response may consist of a code signature. The client service 118 may perform additional post processing to form the final signed code image. For example, the code signature is combined (concatenated) with the code image.

Additional Embodiments

Authentication

As described above, the client and server may mutually authenticate using two-way TLS 122. In addition, the server may also verify the client certificate (e.g., that has been extracted from the transport layer) at the application layer and extract the client account ID from the certificate to check authorization for signing. In this regard, the client account ID is typically in the subject name of the certificate (e.g., the Common Name field). Further, TLS 122 is typically handled by a network stack such as WINDOWS IIS (Internet Information Services). For example, the application may need to extract the TLS certificate from the network stack to perform the extra verification and authorization. Typically, the server may be configured with multiple trusted root CAs, but each signing configuration needs to be explicitly authorized for a particular client certificate. Thus, step 112 authenticates the client service application 118 (using the client certificate) and then compares the configuration-client account pair to the authorizations defined at step 108.

In one or more additional embodiments, instead of or in addition to TLS 122 (or IPSec [Internet Protocol Security]), mutual authentication may be achieved at the application level. For example, the request messages 110 may be signed by the client service application 118 using a client private key, while response messages are signed by the server. Thereafter, both sides may verify the signatures on the received messages before proceeding. Thus, one-way TLS authentication may be utilized where a client service application 118 is authenticated at a server during a TLS session after which the client presents a certificate and establishes its identify by signing the request message at the application level.

Automated API Control

Each signing configuration defined at the code signing server may have a flag to control if an automated API (such as a Restful API) utilizing the certificate-based client authentication is enabled or not. In this regard, using a client certificate (of embodiments of the invention) instead of a hardware token for client authentication may be considered lower in security. As a result, it may be desirable to control use of the automated API on a per configuration basis such that code signing with higher security requirements, such as boot code signing, may not be enabled for automated code signing using certificate-based client authentication. In such embodiments, each configuration may need to be explicitly authorized to enable the client certificate-based automated API. Such a control may be extended to a per company-basis, so that the client certificate-based automated API can only be enabled for certain companies. Regardless of whether the automated API is enabled/disabled, each time a client service application 118 desires to perform a new/different operation, a new request 110 (that includes the configuration for the new request) is transmitted and the steps 112-114 are performed. In this regard, session management based on whether a API is enabled or disabled is a separate process.

Automated Interface

Step 102B may be replaced by an automated interface. In such embodiments, when the CA system 116 issues a new client certificate intended for the code signing server 120 use, the certificate will be automatically (autonomously without additional user input) forwarded to the code signing server 120, and a new client account will be created as a result. Alternatively, the code signing server 120 may periodically poll the CA system 116 for newly issued client certificates and create a client account accordingly.

Access Management

Permission for a client account may be granted/removed on individual, multiple, or all configurations within the code signing server 120. In other words, embodiments of the invention provide flexibility in the management of client authorizations (e.g., permissions/authorizations for a client account may be changed/updated within the code signing server 120). For example, a client account 126 may be deactivated from a system, and once deactivated, the corresponding client service application 118 will not be able to access any configuration. In addition, a client certificate may be revoked thereby resulting in a revocation of access (i.e., a response authorizing an operation would not be granted transmitted at step 114).

Exemplary Embodiments

As described above, embodiments of the invention may be utilized to provide authorization for any client service application. Exemplary embodiments include a code signing service as well as a feature licensing system (i.e., a client authorization for individual license configurations). In a feature licensing system, different configurations may be utilized to provide different levels of authorization/access. For example, authorization to access API functions may be based on client types. In addition to function level access authorization for different client types and API level access authorization for different configurations (e.g., signing configuration or licensing configuration), embodiments of the invention may also control which configuration can use which functions.

To provide flexibility, embodiments may include additional information in a client certificate. For example, client account ID included in the client certificate may include identifying information for both the type of client service application 118 and also a client instance ID which identifies a specific installation of that client (e.g., at a particular customer location or on a particular customer client machine). Further, another signing/licensing configuration level option may include whether to enforce the matching between the client instance ID in the client certificate and the one in the request. In this regard, there may be multiple instances of a client service application 118 installed within a network and a client certificate may be specific to a particular instance which is provided with additional authorization for additional code signing configuration(s). When a request 110 (that contains the additional client instance ID information) is transmitted to the code signing server 120, the client instance ID information may be used to allow the server 120 to conduct such additional checking/verification to confirm that the certificate is being used in accordance with the defined permissions (e.g., at step 108). Further to the above, authorizations may be specified at varying levels (e.g., different clients, different installations within a client, etc.). In further embodiments, any type of information may be included in the client certificate such that any type or level of authorization may be specified and verified.

In addition to the above, embodiments of the invention may be used for any automated services, not just code signing or feature licensing.

General Logical Flow

Figure 2:
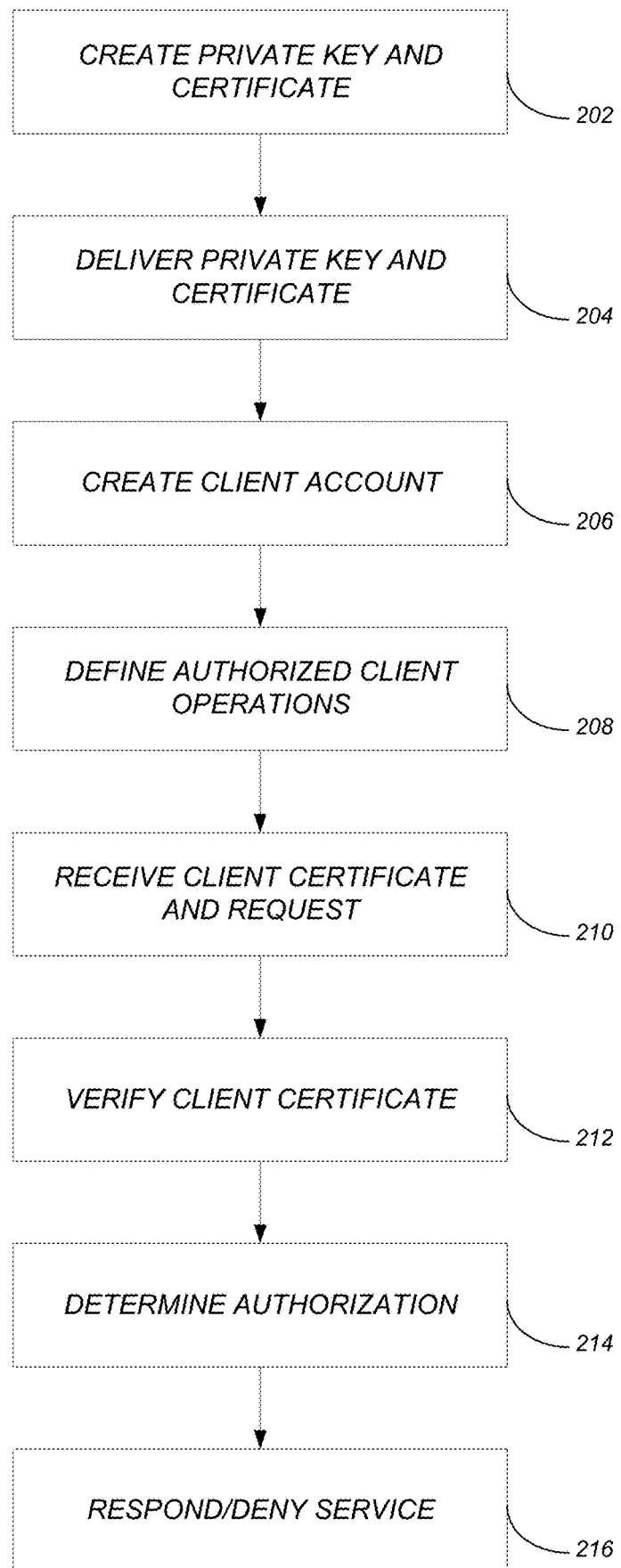
FIG. 2 illustrates the logical flow for authenticating client services in accordance with one or more embodiments of the invention.

In addition to the description and flow described above, FIG. 2 illustrates the logical flow for authenticating client services in accordance with one or more embodiments of the invention.

At step 202, a private key and a client certificate are created for a client service application.

At step 204, the private key and the client certificate are delivered to the client service application. The private key and the client certificate may be delivered either directly to the client service application or to its administrator in an encrypted format. Once received by an administrator, the private key and the client certificate are installed into the environment of the client service application.

At step 206, based on the private key and the certificate, a client account is created/defined for the client service application on a server. Alternatively, upon creation of the client certificate at step 202, the client certificate is automatically/autonomously forwarded to the server (in step 204) triggering the automatic creation of the client account (without human interaction) at step 206. In alternative embodiments, the server may periodically poll (the CA authority) for newly created client certificates, and upon determining that the client certificate has been created, the server autonomously and automatically creates the client account.

At step 208, on the server, the client account is authorized for one or more configurations. In other words, one or more authorized client operations are defined for the client account. The configurations may have already been defined at an earlier stage. For a code signing service, the configuration information consists of signing configuration parameters, including the cryptographic operations, signing and/or encryption keys, and any other parameters needed to complete the operations.

In alternative embodiments, the function of the client service is to obtain a signed license file with a list of features and capabilities for which a target system is authorized. Server configurations in this case may consist of either binary flags (to turn a feature on or off) or counted features (e.g., maximum number of users allowed). Thus, the configuration information may include licensing configuration parameters for one or more software or hardware features.

At step 210, the client certificate and a request to perform a requested client service are received (from the client service application on the server). The request includes a server configuration identifier for the requested client service. Step 210 may also include establishing a two-way transport layer security (TLS) connection between the client service application and the server. The client service application and the server would mutually authenticate using the TLS connection, and the client certificate is received inside a TLS handshake during step 210.

At step 212, the server verifies the client certificate—as part of a TLS handshake, at application layer or both. Further, step 212 includes extracting a client account ID from the client certificate.

At step 214, the server determines whether the client (e.g., the client account corresponding to the client service application) is authorized to perform the requested client service. Such a determination is based on the client account ID and configuration information associated with the server configuration identifier. In one or more embodiments, the server verifies the client certificate at an application layer (at step 212) and extracts a client account ID from the client certificate to check authorization (at step 214). Steps 212-214 may also include controlling whether the client certificate-based automated application programming interface (API) has been enabled for the client via a flag in the configuration information defined on the server.

At step 216, upon determining that the client is or is not authorized to perform the requested client service, the request is processed and the client service application either receives a successful result of the requested operation or a denial indicator.

Hardware Environment

Figure 3:
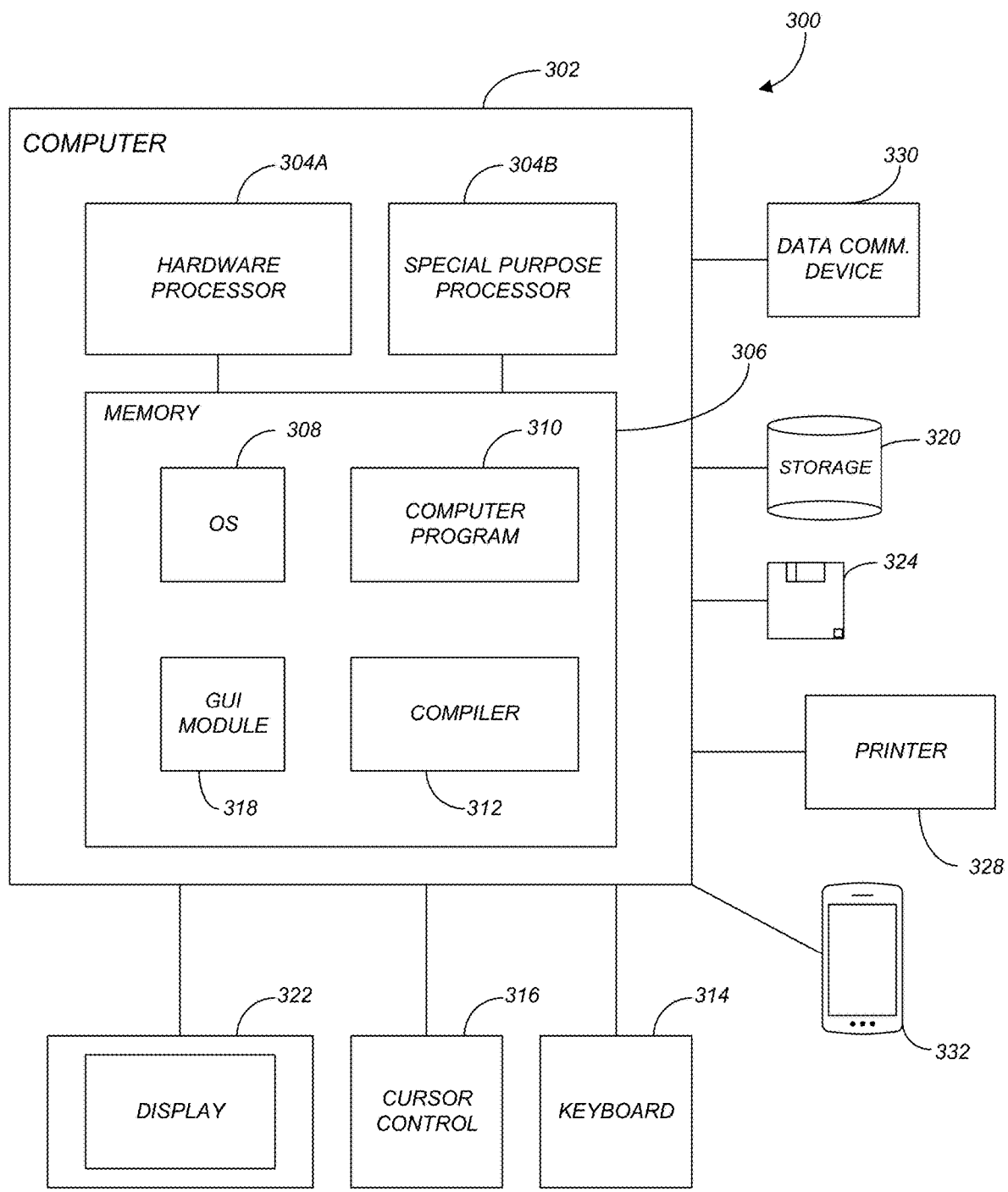
FIG. 3 is an exemplary hardware and software environment used to implement one or more embodiments of the invention.

FIG. 3 is an exemplary hardware and software environment 300 (referred to as a computer-implemented system and/or computer-implemented method) used to implement one or more embodiments of the invention. The hardware and software environment includes a computer 302 and may include peripherals. Computer 302 may be a user/client computer, server computer, or may be a database computer. The computer 302 comprises a hardware processor 304A and/or a special purpose hardware processor 304B (hereinafter alternatively collectively referred to as processor 304) and a memory 306, such as random access memory (RAM). The computer 302 may be coupled to, and/or integrated with, other devices, including input/output (I/O) devices such as a keyboard 314, a cursor control device 316 (e.g., a mouse, a pointing device, pen and tablet, touch screen, multi-touch device, etc.) and a printer 328. In one or more embodiments, computer 302 may be coupled to, or may comprise, a portable device 332 (e.g., cellular device, tablet computer, personal digital assistant, etc.). In yet another embodiment, the computer 302 may comprise a multi-touch device, mobile phone, gaming system, internet enabled television, television set top box, or other internet enabled device executing on various platforms and operating systems.

In one embodiment, the computer 302 operates by the hardware processor 304A performing instructions defined by the computer program 310 (e.g., a client service application and/or code signing server) under control of an operating system 308. The computer program 310 and/or the operating system 308 may be stored in the memory 306 and may interface with the user and/or other devices to accept input and commands and, based on such input and commands and the instructions defined by the computer program 310 and operating system 308, to provide output and results.

Output/results may be presented on the display 322 or provided to another device for presentation or further processing or action. In one embodiment, the display 322 comprises a liquid crystal display (LCD) having a plurality of separately addressable liquid crystals. Alternatively, the display 322 may comprise a light emitting diode (LED) display having clusters of red, green and blue diodes driven together to form full-color pixels. Each liquid crystal or pixel of the display 322 changes to an opaque or translucent state to form a part of the image on the display in response to the data or information generated by the processor 304 from the application of the instructions of the computer program 310 and/or operating system 308 to the input and commands. The image may be provided through a graphical user interface (GUI) module 318. Although the GUI module 318 is depicted as a separate module, the instructions performing the GUI functions can be resident or distributed in the operating system 308, the computer program 310, or implemented with special purpose memory and processors.

In one or more embodiments, the display 322 is integrated with/into the computer 302 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 302 according to the computer program 310 instructions may be implemented in a special purpose processor 304B. In this embodiment, some or all of the computer program 310 instructions may be implemented via firmware instructions stored in a read only memory (ROM), a programmable read only memory (PROM) or flash memory within the special purpose processor 304B or in memory 306. The special purpose processor 304B may also be hardwired through circuit design to perform some or all of the operations to implement the present invention. Further, the special purpose processor 304B may be a hybrid processor, which includes dedicated circuitry for performing a subset of functions, and other circuits for performing more general functions such as responding to computer program 310 instructions. In one embodiment, the special purpose processor 304B is an application specific integrated circuit (ASIC).

The computer 302 may also implement a compiler 312 that allows an application or computer program 310 written in a programming language such as C, C++, Assembly, SQL, PYTHON, PROLOG, MATLAB, RUBY, RAILS, HASKELL, or other language to be translated into processor 304 readable code. Alternatively, the compiler 312 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 310 accesses and manipulates data accepted from I/O devices and stored in the memory 306 of the computer 302 using the relationships and logic that were generated using the compiler 312.

The computer 302 also optionally comprises an external communication device such as a modem, satellite link, Ethernet card, or other device for accepting input from, and providing output to, other computers 302.

In one embodiment, instructions implementing the operating system 308, the computer program 310, and the compiler 312 are tangibly embodied in a non-transitory computer-readable medium, e.g., data storage device 320, which could include one or more fixed or removable data storage devices, such as a zip drive, floppy disc drive 324, hard drive, CD-ROM drive, tape drive, etc. Further, the operating system 308 and the computer program 310 are comprised of computer program 310 instructions which, when accessed, read and executed by the computer 302, cause the computer 302 to perform the steps necessary to implement and/or use the present invention or to load the program of instructions into a memory 306, thus creating a special purpose data structure causing the computer 302 to operate as a specially programmed computer executing the method steps described herein. Computer program 310 and/or operating instructions may also be tangibly embodied in memory 306 and/or data communications devices 330, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 302.

Figure 4:
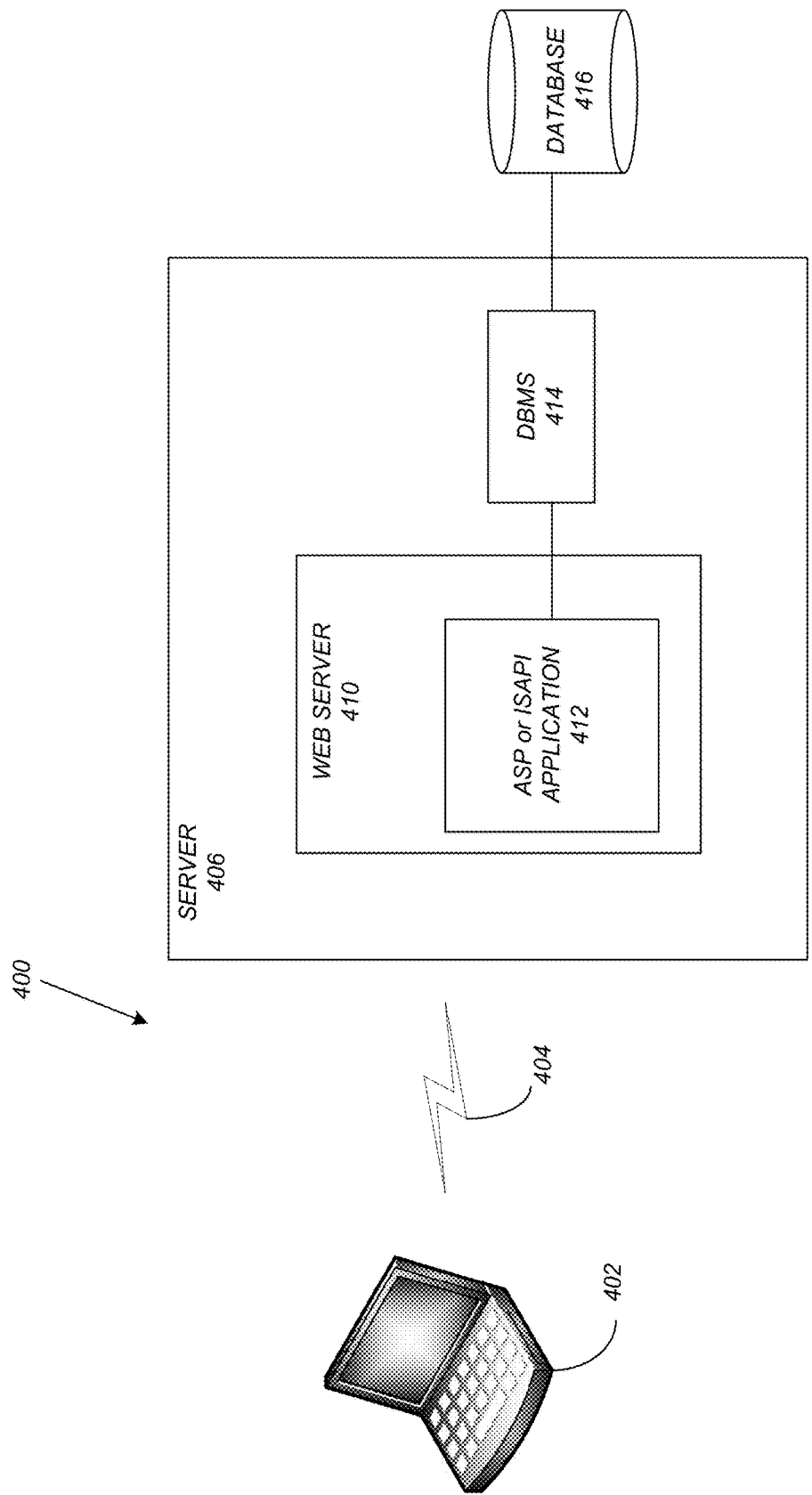
FIG. 4 is an exemplary hardware and software environment used to implement one or more embodiments of the invention.

FIG. 4 schematically illustrates a typical distributed/cloud-based computer system 400 using a network 404 to connect client computers 402 to server computers 406. A typical combination of resources may include a network 404 comprising the Internet, LANs (local area networks), WANs (wide area networks), SNA (systems network architecture) networks, or the like, clients 402 that are personal computers or workstations (as set forth in FIG. 3), and servers 406 that are personal computers, workstations, minicomputers, or mainframes (as set forth in FIG. 3). However, it may be noted that different networks such as a cellular network (e.g., GSM [global system for mobile communications] or otherwise), a satellite based network, or any other type of network may be used to connect clients 402 and servers 406 in accordance with embodiments of the invention.

A network 404 such as the Internet connects clients 402 to server computers 406. Network 404 may utilize ethernet, coaxial cable, wireless communications, radio frequency (RF), etc. to connect and provide the communication between clients 402 and servers 406. Further, in a cloud-based computing system, resources (e.g., storage, processors, applications, memory, infrastructure, etc.) in clients 402 and server computers 406 may be shared by clients 402, server computers 406, and users across one or more networks. Resources may be shared by multiple users and can be dynamically reallocated per demand. In this regard, cloud computing may be referred to as a model for enabling access to a shared pool of configurable computing resources.

Clients 402 may execute a client application or web browser and communicate with server computers 406 executing web servers 410. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 402 may be downloaded from server computer 406 to client computers 402 and installed as a plug-in or ACTIVEX control of a web browser. Accordingly, clients 402 may utilize ACTIVEX components/component object model (COM) or distributed COM (DCOM) components to provide a user interface on a display of client 402. The web server 410 is typically a program such as MICROSOFT'S INTERNET INFORMATION SERVER (IIS).

Web server 410 may host an Active Server Page (ASP) or Internet Server Application Programming Interface (ISAPI) application 412, which may be executing scripts. The scripts invoke objects that execute business logic (referred to as business objects). The business objects then manipulate data in database 416 through a database management system (DBMS) 414. Alternatively, database 416 may be part of, or connected directly to, client 402 instead of communicating/obtaining the information from database 416 across network 404. When a developer encapsulates the business functionality into objects, the system may be referred to as a component object model (COM) system. Accordingly, the scripts executing on web server 410 (and/or application 412) invoke COM objects that implement the business logic. Further, server 406 may utilize MICROSOFT'S TRANSACTION SERVER (MTS) to access required data stored in database 416 via an interface such as ADO (Active Data Objects), OLE DB (Object Linking and Embedding DataBase), or ODBC (Open DataBase Connectivity).

Generally, these components 400-416 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 402 and 406 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 402 and 406. Embodiments of the invention are implemented as a software application on a client 402 or server computer 406. Further, as described above, the client 402 or server computer 406 may comprise a thin client device or a portable device that has a multi-touch-based display.

CONCLUSION

This concludes the description of the preferred embodiments of the present disclosure. The following describes some alternative embodiments for accomplishing the present invention. For example, any type of computer, such as a mainframe, minicomputer, or personal computer, or computer configuration, such as a timesharing mainframe, cloud computing system, local area network, or standalone personal computer, could be used with the present invention.

In addition, advantages of embodiments of the invention differ from prior art certificate chain trust implementations while also not requiring hardware token/dongles. Embodiments of the invention are configurable as additional information is set forth/defined in a client certificate that may be used for additional authentication/verification, as well as for authorization of different services based on different clients/client types.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A computer-implemented method of authenticating client services, comprising:
   creating a private key and a client certificate for a client service application;
   delivering the private key and the client certificate for installation in an environment of the client service application creating, based on the private key and the certificate, a client account for the client service application on a server;

defining, on the server, one or more authorized client operations for the client account;

receiving, from the client service application on the server, the client certificate and a request to perform a requested client service, wherein the request comprises a server configuration identifier for the requested client service;

verifying, on the server, the client certificate at an application layer;

extracting a client account ID from the client certificate;

determining whether the client account corresponding to the client service application is authorized to perform the requested client service, wherein the determining is based on the client account ID and configuration information associated with the server configuration identifier;

upon determining that the client account is authorized to perform the requested client service, processing the request and sending the authorization to the client service application; and upon determining that the client account is not authorized to perform the requested client service, denying the requested client service.

2. The computer-implemented method of claim 1, wherein the private key and the client certificate are delivered to the client service application in an encrypted format.

3. The computer-implemented method of claim 1, further comprising:

installing the private key and the client certificate into the environment of the client service application.

4. The computer-implemented method of claim 1, further comprising:

establishing a two-way transport layer security (TLS) connection between a client and the server, wherein:

the client and the server mutually authenticate using the TLS connection;

the receiving and sending are transmitted via the TLS connection.

5. The computer-implemented method of claim 1, further comprising:

controlling whether a client certificate-based automated application programming interface (API) has been enabled for a client via a flag in the configuration information associated with the server.

6. The computer-implemented method of claim 1, wherein:

upon creating the client certificate, the client certificate is autonomously forwarded to the server triggering an automatic creation of the client account without human interaction.

7. The computer-implemented method of claim 1, further comprising:

the server periodically polling for newly created client certificates, and upon determining that the client certificate has been created, the server autonomously and automatically creates the client account.

8. The computer-implemented method of claim 1, wherein:

the requested client service comprises a code signing service; and the configuration information comprises signing configuration parameters.

9. The computer-implemented method of claim 1, wherein:

the requested client service comprises feature licensing;

the configuration information comprises licensing configuration parameters for one or more software or hardware features.

10. A computer-implemented system for enforcing application protection, comprising:

(a) a server computing environment communicatively coupled to a client computing environment executing a client service application, wherein the server computing environment comprises one or more computers;

(b) the one or more computers, wherein each of the one or more computers has a memory storing a set of instructions and a processor that executes the set of instructions;

(c) a certificate authority (CA) utility executing on one or more of the processors via the set of instructions, wherein the set of instructions when executed cause the CA utility to:

(i) create a private key and a client certificate for a client in the client computing environment;

(ii) deliver the private key and the client certificate to the client service application;

(d) a server process executing on one or more of the processors in the server computing environment via the set of instructions, wherein the set of instructions when executed cause the server process to:

(i) create, based on the private key and the certificate, a client account for the client in the server computing environment;

(ii) define, on the server computing environment, one or more authorized client operations for the client account;

(iii) receive, from the client service application, the client certificate and a request to perform a requested client service, wherein the request comprises a server configuration identifier for the requested client service;

(iv) verify the client certificate at an application layer;

(v) extract a client account ID from the client certificate;

(vi) determine whether the client account corresponding to the client service application is authorized to perform the requested client service, wherein the determination is based on the client account ID and configuration information associated with the server configuration identifier;

(vii) upon a determination that the client account is authorized to perform the requested client service, process the request and send the result of the requested client service to the client service application; and (vii) upon a determination that the client is not authorized to perform the requested client service, deny the requested client service.

11. The computer-implemented system of claim 10, wherein the private key and the client certificate are delivered to the client in an encrypted format.

12. The computer-implemented system of claim 10, wherein:

the private key and the client certificate are installed into the client computing environment.

13. The computer-implemented system of claim 10, wherein:

the server computing environment is communicatively coupled to the client computing environment via a two-way transport layer security (TLS) connection, wherein:

the client computing environment and the server computing environment mutually authenticate using the TLS connection;

the server computing environment receives the client certificate and request, and returns a result of the requested client service or a denial indicator via the TLS connection.

14. The computer-implemented system of claim 10, wherein:

control of whether a client certificate-based automated application programming interface (API) has been enabled for the client account is defined via a flag in the configuration information.

15. The computer-implemented system of claim 10, wherein:

upon creation of the client certificate, the client certificate is autonomously forwarded to the server computing environment triggering an automatic creation of the client account without human interaction.

16. The computer-implemented system of claim 10, wherein:

the server computing environment periodically polls for newly created client certificates, and upon a determination that the client certificate has been created, the server computing environment autonomously and automatically creates the client account.

17. The computer-implemented system of claim 10, wherein:

the client service application comprises a code signing service; and the configuration information comprises signing configuration parameters.

18. The computer-implemented system of claim 10, wherein:

the client service application comprises feature licensing;

the configuration information comprises licensing configuration parameters for one or more software or hardware features.

\* \* \* \* \*